United States Patent
Yokoyama

(10) Patent No.: US 10,343,566 B2
(45) Date of Patent: Jul. 9, 2019

(54) VEHICLE SEAT

(71) Applicant: TACHI-S CO., LTD., Akishima-shi, Tokyo (JP)

(72) Inventor: Takashi Yokoyama, Tokyo (JP)

(73) Assignee: TACHI-S CO., LTD., Tokyo (JP)

( * ) Notice: Subject to any disclaimer, the term of this patent is extended or adjusted under 35 U.S.C. 154(b) by 0 days.

(21) Appl. No.: 15/518,819

(22) PCT Filed: Nov. 4, 2015

(86) PCT No.: PCT/JP2015/081038
§ 371 (c)(1),
(2) Date: Apr. 13, 2017

(87) PCT Pub. No.: WO2016/076174
PCT Pub. Date: May 19, 2016

(65) Prior Publication Data
US 2017/0240082 A1 Aug. 24, 2017

(30) Foreign Application Priority Data
Nov. 10, 2014 (JP) .................... 2014-227959

(51) Int. Cl.
*A47C 31/02* (2006.01)
*B60N 2/58* (2006.01)
(Continued)

(52) U.S. Cl.
CPC .......... *B60N 2/5825* (2013.01); *A47C 31/02* (2013.01); *A47C 31/023* (2013.01); *B60N 2/58* (2013.01);
(Continued)

(58) Field of Classification Search
CPC .......... B60N 2/5825; B60N 2/72; B60N 2/58; B60N 2/5883; A47C 31/02; A47C 31/023
(Continued)

(56) References Cited

U.S. PATENT DOCUMENTS 3,844,614 A * 10/1974 Babbs .................. B60N 2/5825
297/452.2
5,195,222 A * 3/1993 Rink .................... A47C 31/023
24/581.1
(Continued)

FOREIGN PATENT DOCUMENTS

FR 2686553 A1 * 7/1993 .......... B60N 2/5883
JP 61-95396 U 6/1986
(Continued)

OTHER PUBLICATIONS

International Search Report from International Patent Application No. PCT/JP2015/081038, dated Jan. 26, 2016.
(Continued)

*Primary Examiner* — Syed A Islam
(74) *Attorney, Agent, or Firm* — Shapiro, Gabor and Rosenberger, PLLC

(57) ABSTRACT

A vehicle seat is provided with a seat cushion and a seat back. The seat back is provided with a resin frame at least a part of the rear surface side of which is exposed; a pad material disposed on the resin frame; a trim cover for covering the pad material; and a resin hook mounted to an end of the trim cover. The resin frame has a turned-back end formed by turning back outward in a U shape an end of the resin frame. The resin hook is engaged with the turned-back end. The resin hook has a protrusion at the portion thereof which is located within the turned-back end.

11 Claims, 10 Drawing Sheets

(51) Int. Cl.
*B60N 2/68* (2006.01)
*B60N 2/72* (2006.01)

(52) U.S. Cl.
CPC .............. *B60N 2/5883* (2013.01); *B60N 2/68* (2013.01); *B60N 2/72* (2013.01)

(58) Field of Classification Search
USPC ..... 297/452.38, 218.3, 218.1, 218.5, 452.58, 297/452.59
See application file for complete search history.

(56) References Cited

U.S. PATENT DOCUMENTS

| | | | | |
|---|---|---|---|---|
| 5,645,321 | A * | 7/1997 | Seroldi ................ | A47C 31/04 297/452.63 |
| 5,826,939 | A * | 10/1998 | Beyer ................ | B60N 2/5825 297/218.3 |
| 5,879,051 | A * | 3/1999 | Cozzani ............... | A47C 31/023 297/218.1 |
| 8,820,833 | B2 * | 9/2014 | Tsuchiya ............... | B60N 2/682 297/218.3 |
| 8,979,195 | B2 * | 3/2015 | Itakura ................ | B60N 2/6027 297/218.2 |
| 2003/0151280 | A1 * | 8/2003 | Hashiguchi .......... | B60N 2/5825 297/218.1 |
| 2014/0183913 | A1 * | 7/2014 | Hage-Hassan ....... | B60N 2/5825 297/218.3 |
| 2014/0284987 | A1 * | 9/2014 | Yasuda ................... | B60N 2/68 297/452.18 |

FOREIGN PATENT DOCUMENTS

| | | |
|---|---|---|
| JP | 06-312066 A | 11/1994 |
| JP | 2007-195722 A | 8/2007 |
| JP | 2011-045622 A | 3/2011 |
| JP | 2011-178300 A | 9/2011 |
| JP | 2012-125505 A | 7/2012 |
| WO | WO 2008/019981 A1 | 2/2008 |

OTHER PUBLICATIONS

Extended European Search Report dated May 29, 2018, in European Patent Application No. EP15859790.6.

* cited by examiner

VEHICLE SEAT

This application claims priority to Japanese Patent Application No. 2014-227959 filed on Nov. 10, 2014, the contents of which are incorporated herein by reference.

TECHNICAL FIELD

The present disclosure relates to a vehicle seat and is applicable to, for example, end treatment for a trim cover of a seat back.

BACKGROUND ART

Generally, a vehicle seat is composed of a seat cushion, a seat back provided to stand on the rear side of the seat cushion, and so on. Furthermore, the seat cushion and the seat back are each composed of a seat cushion frame or seat back frame, a pad material (cushion material), and a trim cover as an upholstery member with which the pad material is covered. For example, according to Japanese Patent Application No. 2011-45622, end treatment for a trim cover is performed as follows: "A J-shaped hook 10 attached to an end of a piece of upholstery 6 is engaged with a J-shaped hook 11 attached to an end of a rear member 7, so that the ends of the piece of upholstery 6 and the rear member are connected and secured" (see Paragraph [0025]).

CITATION LIST

Patent Literature

Patent Literature 1: Japanese Patent Application Laid-Open No. 2011-45622

SUMMARY OF INVENTION

Technical Problem

The inventor of this application conducted studies on end treatment for a trim cover of a seat back where a resin frame is exposed, resulting in a finding that there arises the following problem.

Specifically, if in order to improve the appearance quality of the seat back a turned-back end of the resin frame is reduced in width to assemble an end member of the trim cover with a quasi-press fit to the turned-back end, the moldability of the resin frame and the assemblability of the trim cover are decreased.

A challenge of the present disclosure is to provide a vehicle seat capable of improving the moldability of the resin frame and the assemblability of the trim cover.

Other challenges and novel features will be apparent from the description of the present disclosure and the accompanying drawings.

Solution to Problem

A brief description will be given below of a summary of a representative one of aspects according to the present disclosure.

A vehicle seat includes a seat cushion and a seat back. The seat back includes a resin frame a rear surface of which is at least partly exposed, a pad material disposed on the resin frame, a trim cover covering the pad material, and a resin hook attached to an end of the trim cover. The resin frame has a turned-back end formed by turning an end of the resin frame back outward in a U shape. The resin hook is engaged with the turned-back end. The resin hook has a protrusion at a portion thereof located within the turned-back end.

Advantageous Effects of Invention

According to the present disclosure, the moldability of the resin frame and the assemblability of the trim cover can be improved.

DESCRIPTION OF EMBODIMENTS

Figure 1:
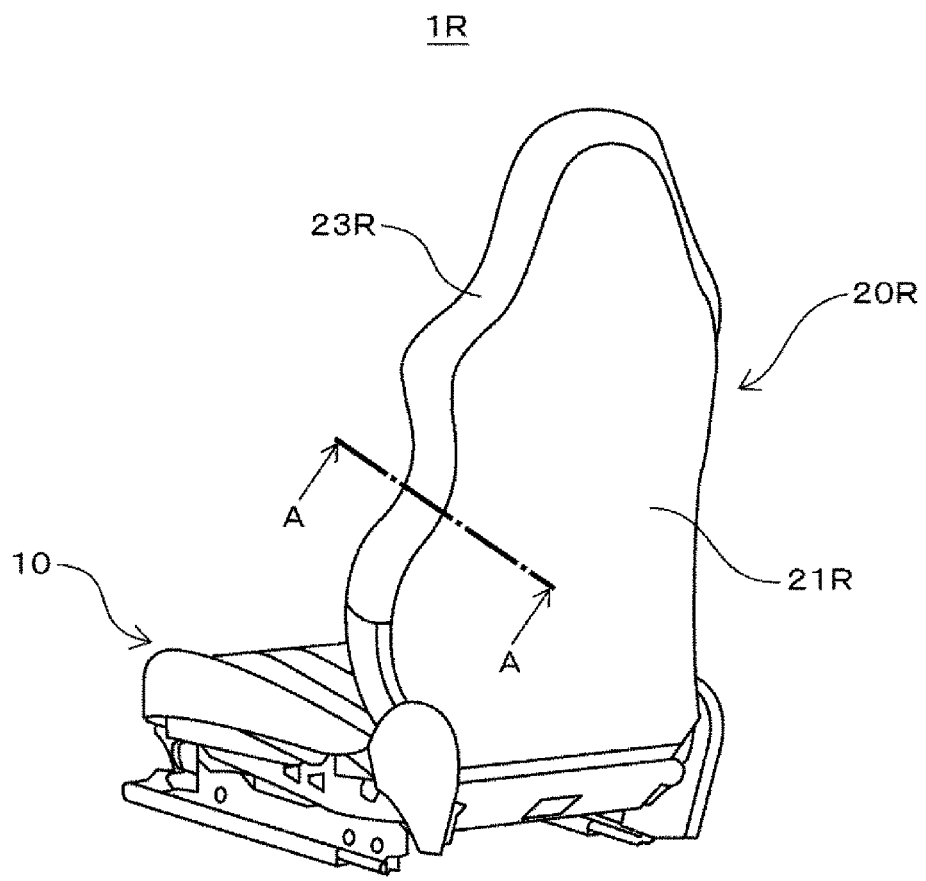
FIG. 1 is a perspective view for illustrating a vehicle seat according to a comparative example.

Hereinafter, a description will be given of an embodiment with reference to the drawings. In the following description, the same components are designated by the same references and repetitive explanation thereof may be omitted. It should be noted that although for further clarity of explanation the width, thickness, shape, and so one of each component may be schematically shown in the drawings as compared with the reality, they are merely illustrative and are not intended to restrict the interpretation of the present invention.

First, prior to the present disclosure, a description will be given of a technique on which the inventor of this application conducted studies (hereinafter, referred to as a "comparative example") with reference to FIGS. 1 to 5.

Figure 2:
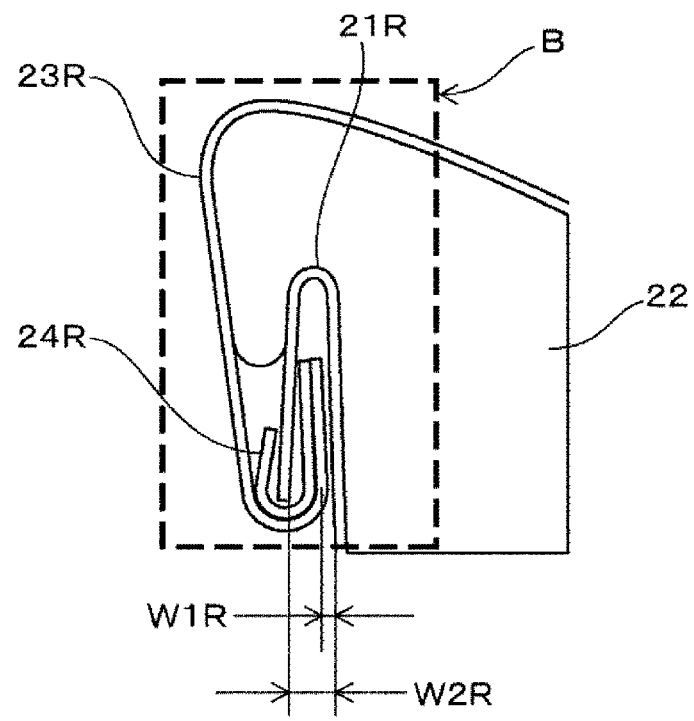
FIG. 2 is a cross-sectional view for illustrating the vehicle seat according to the comparative example.
Figure 3:
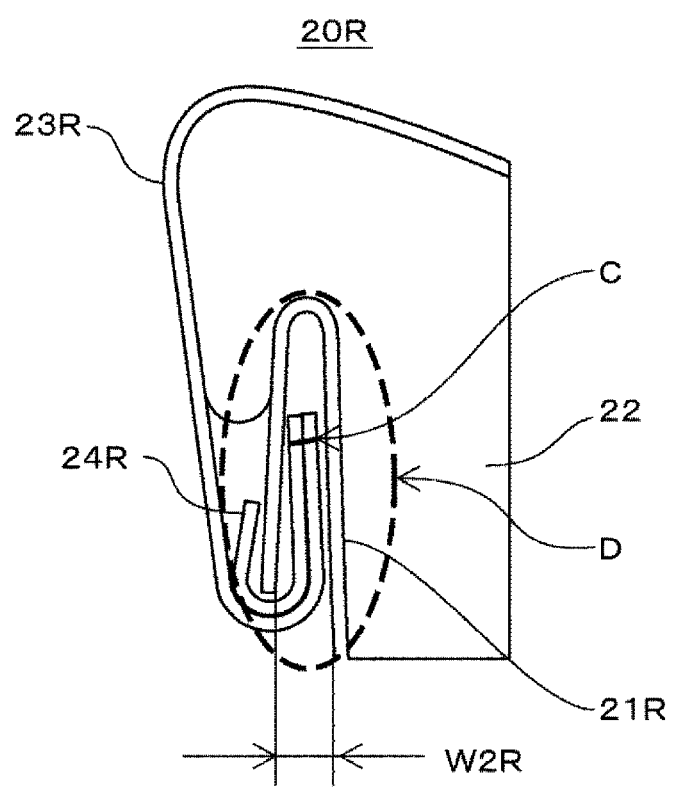
FIG. 3 is a cross-sectional view for illustrating the vehicle seat according to the comparative example.
Figure 4:
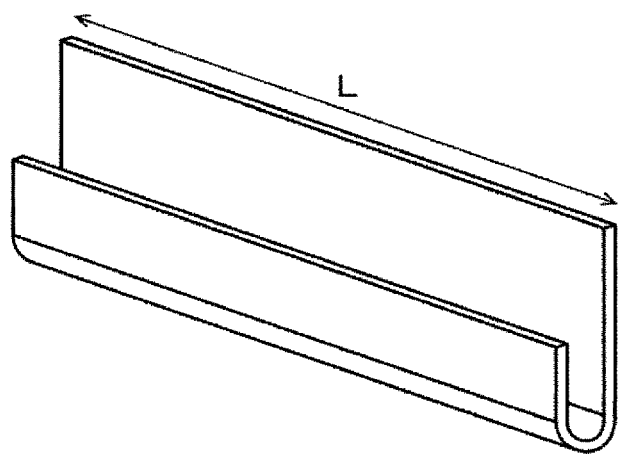
FIG. 4 is a perspective view for illustrating a resin hook according to the comparative example.
Figure 5:
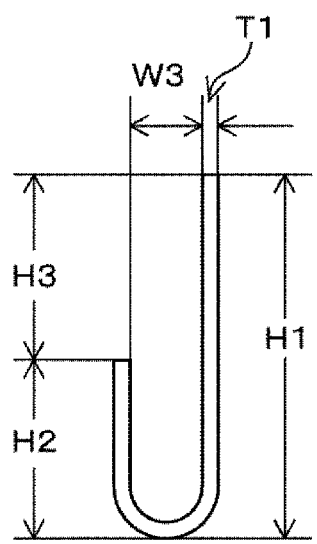
FIG. 5 is a cross-sectional view for illustrating the resin hook according to the comparative example.

FIG. 1 is a perspective view showing a vehicle seat according to a comparative example. FIG. 2 is a cross-sectional view taken along the line A-A in FIG. 1. FIG. 3 is an enlarged cross-sectional view of a portion enclosed by the broken line B in FIG. 2. FIG. 4 is a perspective view of a resin hook according to the comparative example. FIG. 5 is a cross-sectional view of the resin hook according to the comparative example.

As shown in FIG. 1, a vehicle seat 1R according to the comparative example includes a seat cushion 10 and a seat back 20R. The vehicle seat 1R includes an unshown reclining mechanism, wherein the seat back 20R is tiltably connected to the seat cushion 10, the angular movement of the seat back 20R can be controlled, and the angle of tilt of the seat back 20R can be arbitrarily adjusted and set. Furthermore, the vehicle seat 1R is configured to be mounted in the vehicle interior so that the +Y direction is the front direction of the vehicle. The +X direction is referred to as right, −X direction is referred to as left, and the +Z direction is referred to as upward. The side of the vehicle seat as viewed from the front of the vehicle is referred to as the front thereof, while the side of the vehicle seat as viewed from the rear of the vehicle is referred to as the rear thereof.

As shown in FIGS. 2 and 3, the seat back 20R includes a seat back frame (hereinafter, referred to as a "resin frame") 21R made of resin, a pad material 22, and a trim cover 23R as an upholstery member with which the surface of the pad material 22 is covered. The resin frame 21R is exposed on the rear side of the seat back 20R. The trim cover 23R is turned inward and provided at an end C thereof with a hook (hereinafter, referred to as a "resin hook") 24R serving as an engaging member integrally formed of resin and attached by stitching to the end C, and the resin hook 24R is secured, at the inside of a portion of the trim cover 23R turned toward the front side, so that the hollow portion of the resin hook 24R is located toward the front side. Furthermore, the end of the resin frame 21R is turned back outward in a U shape and the hollow portion of the turned-back end thereof is located toward the rear side. The resin hook 24R attached to the end of the trim cover 23R is engaged with the turned-back end D of the resin frame 21R, so that the trim cover 23R is secured to the resin frame 21R.

As shown in FIGS. 4 and 5, the resin hook 24R has a J shape in cross section, the length thereof is L, the height of the higher leg thereof is H1, the height of the lower leg thereof is H2, the difference between the height of the higher leg and the height of the lower leg is H3 (=H1−H2), and the thickness thereof is T1. The inside width of the resin hook is W3.

To improve the appearance quality, it is necessary to narrow the clearance (W1R) between the trim cover 23R and the resin frame 21R. As a result, the clearance (W2R) of the turned-back end D of the resin frame 21R is also narrowed. For example, if W2R is about 10 mm, the radius of curvature of the turned-back portion becomes small, which decreases the durability and moldability of a mold for the resin frame 21R. In addition, no finger can enter the clearance of the turned-back end D of the resin hook 21R, which decreases workability in assembling the resin hook 24R to the trim cover 23R.

Next, a description will be given of a vehicle seat according to an embodiment with reference to FIGS. 6 to 10.

Figure 6:
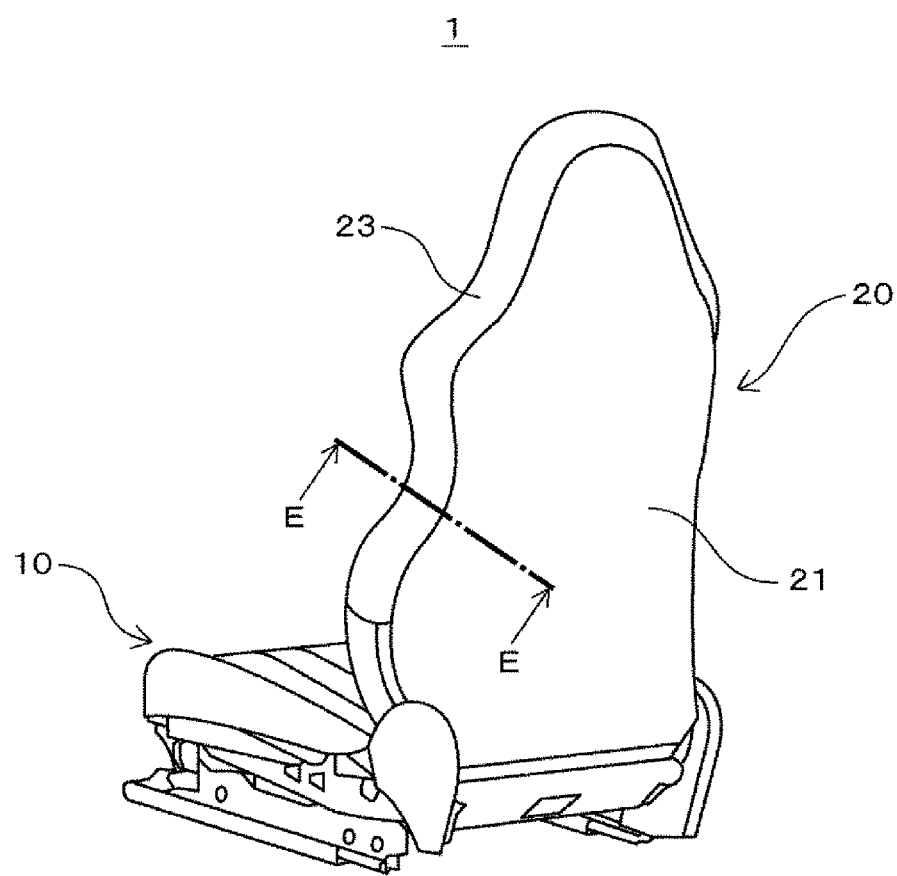
FIG. 6 is a perspective view for illustrating a vehicle seat according to an embodiment.
Figure 7:
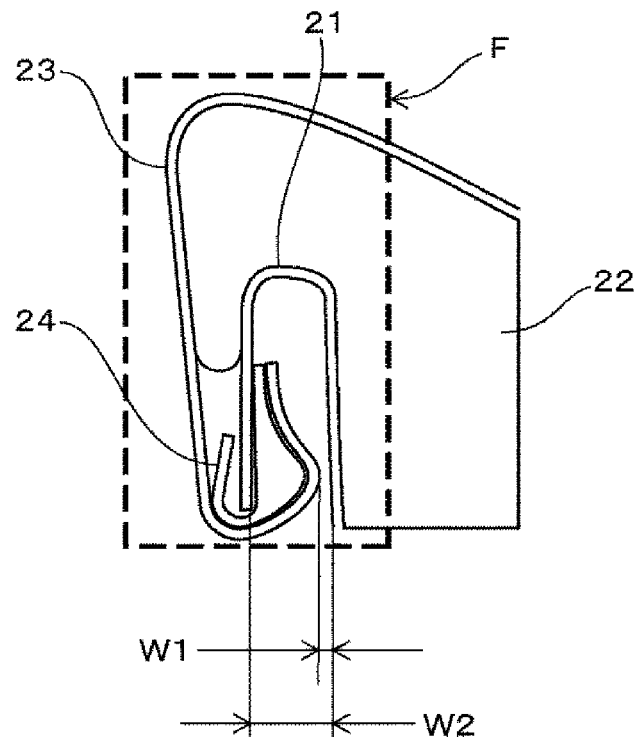
FIG. 7 is a cross-sectional view for illustrating the vehicle seat according to the embodiment.
Figure 8:
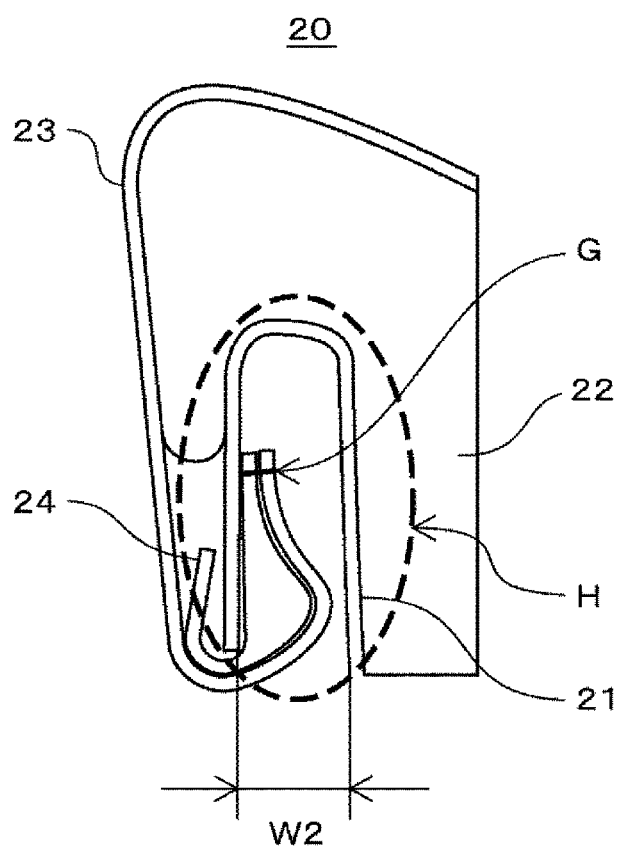
FIG. 8 is a cross-sectional view for illustrating the vehicle seat according to the embodiment.
Figure 9:
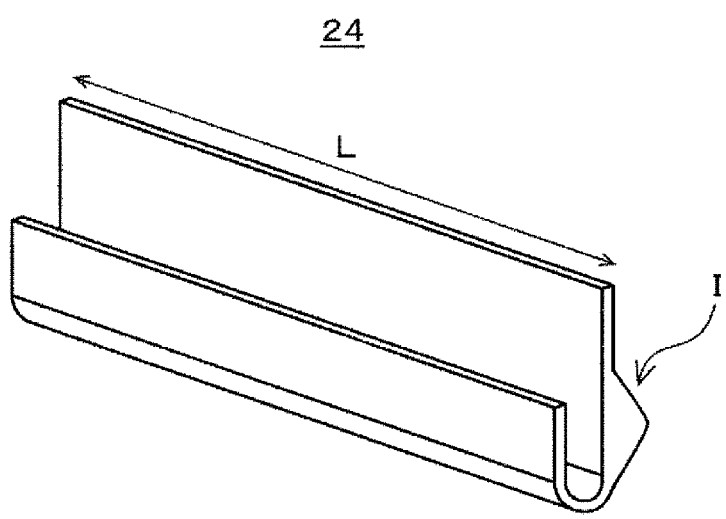
FIG. 9 is a perspective view for illustrating a resin hook according to the embodiment.
Figure 10:
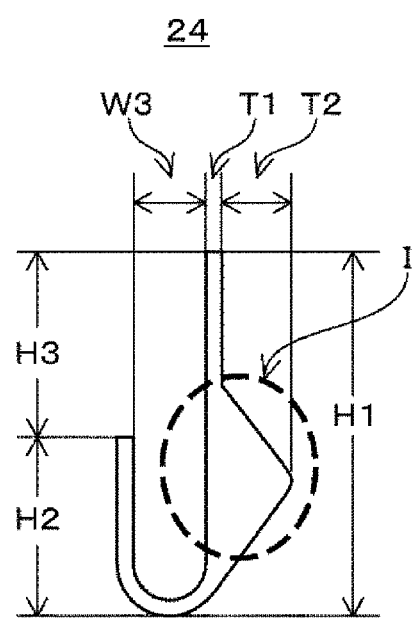
FIG. 10 is a cross-sectional view for illustrating the resin hook according to the embodiment.

FIG. 6 is a perspective view showing a vehicle seat according to an embodiment. FIG. 7 is a cross-sectional view taken along the line E-E in FIG. 6. FIG. 8 is an enlarged cross-sectional view of a portion enclosed by the broken line F in FIG. 7. FIG. 9 is a perspective view of a resin hook according to the embodiment. FIG. 10 is a cross-sectional view of the resin hook according to the embodiment.

As shown in FIG. 6, a vehicle seat 1 according to the embodiment includes a seat cushion 10 and a seat back 20. The vehicle seat 1 includes an unshown reclining mechanism, wherein the seat back 20 is tiltably connected to the seat cushion 10, the angular movement of the seat back 20 can be controlled, and the angle of tilt of the seat back 20 can be arbitrarily adjusted and set. Furthermore, the vehicle seat 1 is configured to be mounted in the vehicle interior so that the +Y direction is the front direction of the vehicle. The +X direction is referred to as right, −X direction is referred to as left, and the +Z direction is referred to as upward. The side of the vehicle seat as viewed from the front of the vehicle is referred to as the front thereof, while the side of the vehicle seat as viewed from the rear of the vehicle is referred to as the rear thereof.

As shown in FIGS. 7 and 8, the seat back 20 includes a resin frame 21, a pad material 22, and a trim cover 23 as an upholstery member with which the surface of the pad material 22 is covered. The resin frame 21 is at least partly exposed on the rear side of the seat back 20. The trim cover 23 is turned inward (to the right in the figures) and provided at an end G thereof with a resin hook 24 attached by stitching to the end G, and the resin hook 24 is secured, at the inside of a portion of the trim cover 23 turned toward the front side, so that the hollow portion of the resin hook 24 is located toward the front side. Furthermore, the end of the resin frame 21 is turned back outward (to the left in the figures) in a U shape and the hollow portion of the turned-back end H thereof is located toward the rear side. The resin hook 24 attached to the end of the trim cover 23 is engaged with the turned-back end H of the resin frame 21, so that the trim cover 23 is secured to the resin frame 21.

As shown in FIGS. 9 and 10, the cross section of the resin hook 24 has a J shape having a triangular protrusion I, the length of the resin hook 24 is L, the height of the higher leg thereof is H1, the height of the lower leg thereof is H2, the difference between the height of the higher leg and the height of the lower leg is H3 (=H1−H2), and the thickness thereof is T1. The thickness of the protrusion I is T2 and the inside width of the resin hook is W3.

To improve the appearance quality, the clearance (W1) between the trim cover 23 and the resin frame 21 is set equal to or less than that in the comparative example (W1≤W1R). However, since the resin hook 24 has a protrusion I having a thickness of T2, the width (W2) of the turned-back end of the resin frame 21 can be T2 larger than that in the comparative example (W2=W2R+T2>W2R). For example, if W2 is 15 mm or more (when W2R is 10 mm, W2 is 15 mm or more at 5 mm or more of T2), the radius of curvature of the turned-back portion can be larger than that in the comparative example, which improves the durability and moldability of a mold for the resin frame 21. In addition, a finger can enter the clearance of the turned-back end H of the resin hook 21, which improves workability in assembling the resin hook 24 to the trim cover 23.

For example, carbon-fiber-reinforced plastic (CFRP) is preferably used for the resin frame 21. CFRP is fiber-reinforced plastic in which carbon fibers are used as the reinforcing material, and epoxy resin is mainly used as the matrix.

Although the invention made by the inventor has thus far been described in concrete terms with reference to the embodiment, it goes without saying that the present invention is not limited to the above embodiment and thus may be modified in various forms.

REFERENCE SIGNS LIST 1, 1R: vehicle seat
10: seat cushion
20, 20: seat back
21, 21R: resin frame
22: pad material
23, 23R: trim cover
24, 24R: resin hook

The invention claimed is:
1. A vehicle seat comprising:
a seat cushion; and
a seat back,
the seat back comprising:
a resin frame having a rear surface which is at least partly exposed;
a pad material disposed on the resin frame;
a trim cover covering the pad material; and a resin hook attached to an end of the trim cover, the resin hook having a first end portion and second end portion with a gap therebetween, wherein the resin frame has a turned-back end turned back outward in a U shape, the resin hook is hooked to and in contact with a terminal end portion side of the turned-back end, the first end portion of the resin hook is positioned within the turned-back end together with the end of the trim cover, the second end portion of the resin hook is located outside the terminal end portion side of the turned-back end, the first end portion of the resin hook has a protrusion located within the turned-back end and facing away from the gap between the first end portion and the second end portion of the resin hook, the trim cover is in contact with the protrusion and covers the resin hook, there is a gap between a portion of the trim cover covering the protrusion and an adjacent portion of the turned-back end, and the gap is smaller than a sum of the thickness of the protrusion and the thickness of the trim cover.

2. The vehicle seat according to claim 1, wherein the protrusion has a triangular cross section.

3. The vehicle seat according to claim 1, wherein an opening side of a hollow portion of the turned-back end is oriented toward a rear side relative to the seat back.

4. The vehicle seat according to claim 1, wherein the trim cover is turned inward and the resin hook is secured, at an inside of an inward-turned portion of the trim cover, so that an opening side of a hollow portion of the resin hook is oriented toward a front side relative to the seat back.

5. The vehicle seat according to claim 1, wherein a terminal portion side of the first end portion of the resin hook is sewn to the end of the trim cover.

6. The vehicle seat according to claim 1, wherein the turned-back end has a clearance of 15 mm or more.

7. The vehicle seat according to claim 1, wherein the resin frame is made of CFRP.

8. The vehicle seat according to claim 1, wherein the gap is smaller than a sum of the thickness of the hook, the thickness of the protrusion, and the thickness of the trim cover.

9. A vehicle seat comprising:
a seat cushion; and
a seat back, the seat back comprising:
a resin frame having a rear surface which is at least partly exposed;
a pad material disposed on the resin frame;
a trim cover covering the pad material; and
a resin hook having an attachment end portion and a distal end portion with a gap therebetween, the attachment end portion being attached to an end of the trim cover, wherein the resin frame has a turned-back end turned back outward in a U shape, the turned-back end includes a first portion extending from a rear side to a front side in a cross-sectional view, a second portion extending from the front side to the rear side in a cross-sectional view and terminating, and a third portion connecting the first portion and the second portion, the first portion, the second portion and the third portion are in contact with the pad material, the resin hook is hooked to and in contact with the second portion of the turned-back end, the attachment end portion of the resin hook has a protrusion facing away from the gap between the attachment and portion and the distal end portion and toward the first portion of the turned-back end, the protrusion being located between the first portion and the second portion of the turned-back end, and the distal end portion being located on the opposite side of the protrusion with respect to the second portion, the attachment end portion of the resin hook is positioned between the first portion and the second portion of the turned-back end together with the end of the trim cover, the trim cover is in contact with the protrusion and covers the resin hook, there is a gap between the first portion of the turned-back end and a portion of the trim cover covering the protrusion, and the gap is smaller than a distance between the second portion and a point where the portion of the trim cover covering the protrusion is closest to the first portion.

10. The vehicle seat according to claim 9, wherein the gap is smaller than a distance from the second portion to a point where the protrusion is closest to the first portion.

11. The vehicle seat according to claim 9, wherein a terminal portion side of the attachment end portion of the resin hook is sewn to the end of the trim cover.

* * * * *